US011282130B2

(12) United States Patent
Dixit et al.

(10) Patent No.: US 11,282,130 B2
(45) Date of Patent: Mar. 22, 2022

(54) METHOD AND SYSTEM FOR INTER-WALLET PAYMENTS FOR CROSS-BORDER TRANSACTIONS

(71) Applicant: MASTERCARD INTERNATIONAL INCORPORATED, Purchase, NY (US)

(72) Inventors: Apoorva Dixit, Roorkee (IN); Ankur Arora, New Delhi (IN); Tushar Rungta, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 313 days.

(21) Appl. No.: 16/389,392

(22) Filed: Apr. 19, 2019

(65) Prior Publication Data

US 2020/0334738 A1 Oct. 22, 2020

(51) Int. Cl.
*G06Q 30/00* (2012.01)
*G06Q 30/06* (2012.01)
*G06Q 10/08* (2012.01)
*G06Q 20/38* (2012.01)
*G06F 16/29* (2019.01)

(52) U.S. Cl.
CPC ..... *G06Q 30/0635* (2013.01); *G06Q 10/0831* (2013.01); *G06Q 20/381* (2013.01); *G06Q 20/389* (2013.01); *G06F 16/29* (2019.01)

(58) Field of Classification Search
CPC ........... G06Q 30/0635; G06Q 10/0831; G06Q 20/381; G06Q 20/389; G06F 16/29
USPC ...................................................... 705/26, 27
See application file for complete search history.

(56) References Cited

U.S. PATENT DOCUMENTS

2007/0088652 A1* 4/2007 Firmage ............. G06Q 30/0603
705/37
2013/0179340 A1* 7/2013 Alba .................. G06Q 30/0633
705/41

(Continued)

OTHER PUBLICATIONS

Click Up A Storm: Thanks to a new breed of online shoppers, you can now fulfill your every retail desire. Cheah Ui-Hoon reports. Ui-Hoon, Cheah. The Business Times [Singapore] Dec. 10, 2016; Dialog #1847570526 3pgs. (Year: 2016).*

(Continued)

*Primary Examiner* — Robert M Pond
(74) *Attorney, Agent, or Firm* — Buchanan Ingersoll & Rooney PC

(57) ABSTRACT

A method for facilitating foreign transactions through inter-currency exchanges and geographical matching includes providing a platform to consumers located in different countries, where a consumer in a first country that desires a product from a second country is matched to a consumer in the second country that desires a product in the first country; the consumers are matched and transactions initiated by the platform to provide transfer of any necessary payment to ensure that each consumer can make the purchase on behalf of the other consumer in their own country, for shipping to the consumer in the other country, negating the need for the consumers to make any international purchases directly while still availing themselves of foreign products without involving merchants and minimizing the effect and amount of cross-border transactions.

16 Claims, 5 Drawing Sheets

(56) References Cited

U.S. PATENT DOCUMENTS

| | | | | |
|---|---|---|---|---|
| 2016/0086253 A1* | 3/2016 | Wu | ................... | G06Q 30/0639 |
| | | | | 705/80 |
| 2016/0342989 A1* | 11/2016 | Davis | ................ | G06Q 20/3827 |
| 2020/0211133 A1* | 7/2020 | Sahagen | ............ | G06Q 30/0278 |

OTHER PUBLICATIONS

Global Shopal vs. Alibaba: Who Will Dominate the Cross-Border Online Shopping Industry for Chinese Consumers?: Who Will Dominate the Cross-Border Online Shopping Industry for Chinese Consumers? PR Newswire [New York] Jun. 12, 2015; Dialog #1687629368 2pgs. (Year: 2015).*

* cited by examiner

METHOD AND SYSTEM FOR INTER-WALLET PAYMENTS FOR CROSS-BORDER TRANSACTIONS

FIELD

The present disclosure relates to facilitating foreign and cross-border transactions through the use of a platform that provides geographical matching and inter-currency exchanges.

BACKGROUND

In the modern world where the Internet enables people to be apprised of what is going on anywhere in the world at any given time, consumers are exposed to a vast array of goods and other products that can be found in other countries that they cannot find locally. In many cases, companies have taken advantage of this new global awareness by importing these products and making them available for sale to local consumers. In other cases, companies take advantage of international shipping services to enable foreign consumers to make purchases.

However, they are often cases where a consumer may want a product that is available for purchase in a foreign country, but where there is no ability for them to purchase the product from where they are located, such as due to currency restrictions by the merchant or a lack of shipping options of the merchant. In some cases, a purchase may be possible for the consumer, but entities involved (e.g., the merchant, an acquirer, the consumer's own bank, etc.) may add significant fees and disadvantageous foreign exchange rates to make the transaction undesirable. At the same time, there may be consumers in different countries that want to make a purchase in the other country, where the consumers would be able to assist one another. However, there are currently no platforms to facilitate such an arrangement, particularly in a manner that could protect each of the consumers involved and accommodate any necessary cross-border transactions.

Thus, there is a need for a technical system that can match consumers together based on geographic locations and locations of desired purchases, to facilitate financial exchanges and accomplish foreign purchases for consumers.

SUMMARY

The present disclosure provides a description of systems and methods for facilitating foreign transactions through inter-currency exchanges and geographical matching. When a consumer desires an item in a foreign country, they can submit a purchase request to a platform that collects purchase requests from consumers throughout the world. The platform can match consumers in two different countries that each desire a product from the other country, and provide each with information regarding the product desired by the consumer in the other country. Each consumer can make the purchase in their home country on behalf of the foreign consumer, with the platform providing the finances to do so (e.g., directly, via an escrow, from accounts in local currency to avoid foreign exchange rates, etc.). In some cases, purchases may be matched based on relative value such that each consumer can purchase the product for the foreign consumer directly with their own funds instead of paying the platform/foreign consumer. Once the purchase is made, each consumer ships the product to the foreign consumer, where the shipping costs may be part of the settlement performed by the platform, or may be offset by each other. The result is that each consumer receives a foreign-purchased product without having to rely on merchants that specialized in that product or complicated cross-border transactions and foreign currency exchanges. In some cases, a blockchain may be used to facilitate the financial transactions, mitigating differences in electronic wallets and foreign currencies that are used.

A method for facilitating foreign transactions through inter-currency exchanges and geographical matching includes: storing, in a memory of a processing server, a plurality of purchase requests, wherein each purchase request includes at least a home geographic location, a request geographic location, a product request, a product amount, a sending address, and a receiving address; receiving, by a receiver of the processing server, a new purchase request from a first computing system, wherein the new purchase request includes a home country, a request country, a requested product, a product price, a source address, and a destination address; executing, by a processing device of the processing server, a query on the memory to identify one or more matched purchase requests where at least (i) the included home geographic location matches the request country, and (ii) the request geographic location matches the home country; initiating, by the processing device of the processing server, one or more payment transactions for payment from the sending address included in each of the one or more matched purchase requests for the product amount included in the respective matched purchase request; initiating, by the processing device of the processing server, an additional payment transaction for payment from the source address for the product price; transmitting, by a transmitter of the processing server, a first purchase message to the first computing system, wherein the first purchase message includes at least the product request included in each of the one or more matched purchase requests; transmitting, by the transmitter of the processing server, a second purchase message to a second computing system associated with the one of the one or more matched purchase requests, wherein the second purchase message includes at least the requested product.

A system for facilitating foreign transactions through inter-currency exchanges and geographical matching includes: a memory of a processing server configured to store a plurality of purchase requests, wherein each purchase request includes at least a home geographic location, a request geographic location, a product request, a product amount, a sending address, and a receiving address; a receiver of the processing server configured to receive a new purchase request from a first computing system, wherein the new purchase request includes a home country, a request country, a requested product, a product price, a source address, and a destination address; a processing device of the processing server configured to execute a query on the memory to identify one or more matched purchase requests where at least (i) the included home geographic location matches the request country, and (ii) the request geographic location matches the home country, initiate one or more payment transactions for payment from the sending address included in each of the one or more matched purchase requests for the product amount included in the respective matched purchase request, and initiate an additional payment transaction for payment from the source address for the product price; and a transmitter of the processing server configured to transmit a first purchase message to the first computing system, wherein the first purchase message includes at least the product request included in each of the one or more matched purchase requests, and transmit a second purchase message to a second computing system associated with the one of the one or more matched purchase requests, wherein the second purchase message includes at least the requested product.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
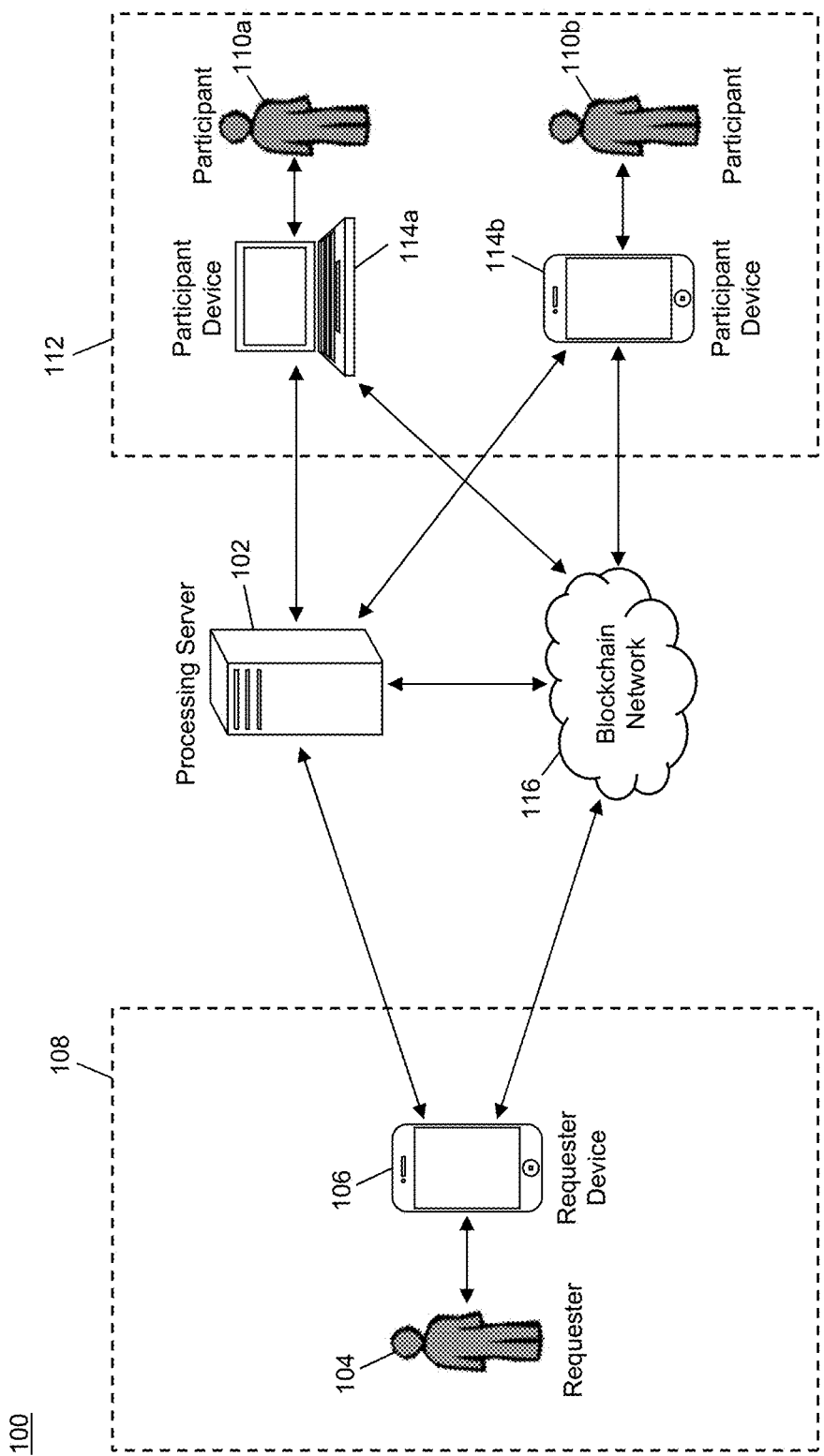
FIG. 1 is a block diagram illustrating a high level system architecture for facilitating foreign transactions through a platform that uses geographical matching in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Facilitating Foreign Transactions

FIG. 1 illustrates a system 100 for facilitating foreign transactions between consumers in different countries for the purchase of goods in each consumer's home country on behalf of the foreign consumer using a platform that is electronic wallet- and currency-agnostic.

The system 100 may include a processing server 102. The processing server 102, discussed in more detail below, may be configured to facilitate transactions between consumers located in different countries that each desire one or more products in the other consumer's country. In the system 100, a requester 104 may be a consumer located in a first country 108. The requester 104 may submit a purchase request to the processing server 102 using a computing device, referred to herein as the requester device 106, requesting the purchase of a product located in a second country 112. The purchase request may be submitted using any suitable method, such as via a web page, an application program executed by the requester device 106, etc. The requester device 106 may be any type of computing device suitable for performing the functions discussed herein, such as a desktop computer, laptop computer, notebook computer, tablet computer, cellular phone, smart phone, smart watch, smart television, wearable computing device, implantable computing device, etc.

The purchase request submitted to the processing server 102 may include at least the first country 108 where the requester 104 is located, the second country 112 where the requester 104 wants a purchase to be made, the product the requester 104 desires from the second country 112 (also referred to herein as the "requested product"), a price that the requester 104 is willing to pay for the product, and a source address and destination address. The source address may be information associated with an account or wallet that may be used to pay for the requested product, where the information comprising the source address may be based on the type of account, currency being used, etc. For instance, if the requester 104 is using a fiat currency, the source address may be a primary account number of a transaction account or an account number and routing number for a transaction account. If the requester 104 is using a cryptographic currency, the source address may be comprised of one or more unspent transaction outputs and a digital signature generated using a private key of a blockchain wallet associated with the cryptographic currency. The destination address may be information associated with an account to which any payment is to be made to the requester 104, such as for use in making a purchase for a consumer located in the second country 112. In some cases, the destination address and the source address may be the same value.

The processing server 102 may receive the purchase request from the requester 104 and store it in a database of received purchase requests stored therein or otherwise accessible thereby. As part of the operation of the platform, the processing server 102 may also receive purchase requests from a plurality of participants 110 located in the second country 112, which each participant may submit through their own respective participant device 114. These purchase requests may also be stored in the database of received purchase requests accessible by the processing server 102.

As purchase requests are received, the processing server 102 may match purchase requests. Purchase requests may be matched based on at least the countries that are involved, where the requester's purchase request may be matched with a participant's purchase request as the requester 104 desires a product purchased in the participant's home country, the second country 112, while the participant 110 desires a product purchased in the requester's home country, the first country 108. In some embodiments, the processing server 102 may match purchase requests based on the price included in each respective purchase request, such that both the requester 104 and the participant 110 are willing to spend the same, or a similar (e.g., within a predetermined range, such as based on a discrete amount or a percentage), amount. In such embodiments, no transfer of currency may be required by the processing server 102. In these embodiments, the requester 104 and participant 110 may each make the purchase in their respective country using their own accounts without any transfers being necessary.

In embodiments where the prices may not match, or where transfer may still be accomplished, such as to protect one of the consumers in the event the other consumer does not satisfy their end of the arrangement, the processing server 102 may initiate a payment transaction for both of the purchases once the match has occurred. In some cases, once purchase requests have been matched, each consumer involved may be required to approve the match, such as by the processing server 102 transmitting information regarding the match to the consumer's computing device, where each consumer can provide approval through their computing device back to the processing server 102. If a consumer does not approve, the purchase requests may be returned to the matching phase, where those two purchase requests may not be matched together again.

The processing server 102 may initiate a payment transaction for each of the purchase requests. In some embodiments, each payment transaction may be for payment directly to the other consumer that is to be making the purchase. For instance, the processing server 102 may initiate a payment transaction for payment from the participant 110 (e.g., using the source address indicated in their purchase request) to the requester 104 (e.g., using the destination address indicated in their purchase request), as well as a payment transaction for payment from the requester 104 to the participant 110. Each of the payment transactions may be for the price included in their payer's purchase request. In some cases, the amount may be increased to accommodate expected shipping expenses or for other fees or taxes. In some instances, a secondary payment transaction may be processed for payment to an entity associated with the processing server 102, such as a fee charged for use of the platform. In some embodiments, payment transactions may be initiated that are paid from each consumer into an escrow account, where payment may only be made from the escrow account to a consumer once shipping and/or receipt of the desired product has been confirmed. In such embodiments, the escrow account may be held by the entity associated with the processing server 102, or a trusted third party.

In cases where the account for each consumer utilizes a different currency, the payment transactions initiated by the processing server 102 may be cross-border transactions. In some cases, the processing server 102 may maintain or otherwise have access to transaction accounts held in various currencies, where payment transactions may be made to/from the held transaction accounts to reduce the number of cross-border transactions. For instance, if the requester 104 is paying $100 for a product and the participant is paying £150, rather than initiate cross-border transactions for both consumers, the processing server 102 may initiate a transaction for payment of the $100 from the requester 104 into an U.S. dollar account held by the processing server 102 and a transaction for payment of the £150 from the participant 110 into a British pound account held by the processing server 102. The processing server 102 may then initiate separate payment transactions for payment of the equivalent amount in each currency to the consumer to make the purchase (e.g., payment of the equivalent of £150 in U.S. dollars to the requester 104).

In some cases, the processing server 102 may identify the net amount for each consumer prior to initiating any payment transactions and may initiate transactions only to achieve the required net position for each consumer. For instance, in the above example, the £150 may be equivalent to $190. The processing server 102 may initiate a payment transaction for payment of £71 from the participant 110 to the processing server's British pounds account (where the remaining £79 is used for their $100-equivalent purchase of the requester's product in the second country 112), and a payment transaction for payment of $90 to the requester 104 from the processing server's U.S. dollar account (where the extra $90 is used for the £150-equivalent purchase of the participant's product in the home country 108).

In some embodiments, the processing server 102 may use a separate currency as an intermediate currency, such as to mitigate changes in foreign exchange rates and to provide a centralized holding for the processing server 102. In such embodiments, payment transactions made to and from the processing server 102 may use the intermediate currency. In some embodiments, a blockchain may be used to facilitate cross-border transactions through the use of a cryptographic currency, or where a cryptographic currency may be used by each of the consumers in place of their local fiat currencies. In such embodiments, the system 110 may include a blockchain network 116.

The blockchain network 116 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 102 may be a node in the blockchain network 116. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 116 prior to the generation and addition of a new block to the blockchain in order for the change to be made permanent. Computational and communication limitations may make such a modification exceedingly difficult, if not impossible, thus rendering the blockchain immutable.

The blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 106 using the public key of the cryptographic key pair. In some cases, the term "blockchain wallet" may refer specifically to the private key. In other cases, the term "blockchain wallet" may refer to the computing device that stores the private key for use thereof in blockchain transactions. For instance, the processing server 102 may store a private key for its own blockchain wallet, and the requester device 106 and participant devices 114 may each have their own private keys for their own respective blockchain wallets.

Each blockchain data value stored in the blockchain may correspond to a blockchain transaction. A blockchain transaction may consist of at least: a digital signature of the sender of currency that is generated using the sender's private key, a blockchain address of the recipient of currency generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction. In some cases, a blockchain transaction may also include the sender's public key, for use by any entity in validating the transaction. For the processing of a blockchain transaction, such data may be provided to a node in the blockchain network 106, either by the sender or the recipient. The node may verify the digital signature and the sender's access to the funds, and then include the blockchain transaction in a new block. The new block may be validated by other nodes in the blockchain network 106 before being added to the blockchain and distributed to all of the nodes in the blockchain network 106.

In embodiments where a blockchain may be used, the source address included in a purchase request may be transaction outputs having sufficient currency associated therewith to cover the product price as well as a digital signature generated using the consumer's private key, and the destination address may be an address generated using the consumer's public key for receipt of cryptographic currency using the blockchain. The processing server 102 may initiate blockchain transactions by including the requisite information necessary for transfer of the required amount from one blockchain wallet to another. Blockchain transactions may be submitted to a node in the blockchain network 116, which may confirm the transactions and add them to the blockchain using traditional methods and systems.

After any necessary payment transactions have been initiated and processed, the consumers involved may make the required purchases in their local country. For instance, the requester 104 may purchase the participant's desired product in the first country 108 and the participant 110 may purchase the requester's desired product in the second country 112. In some embodiments, the processing server 102 may provide contact information for each consumer to the other, or may otherwise operate a service enabling the consumers to communicate with one another to help facilitate the foreign purchase. For example, the requester 104 may want additional information (e.g., sizing, coloring, versioning, etc.) regarding the participant's desired product to ensure that the correct product is purchased, where the processing server 102 may provide a service to enable the consumers to communicate directly or through messaging through the processing server 102 or a third party service.

Once a consumer has purchased a product, the consumer may arrange to have the product shipped to the foreign consumer located in the foreign country. In some cases, the purchase request may include shipping information, which may be provided to the consumer along with the requested product. In other cases, the communication channel established between the consumers may be used to exchange shipping information. Once the product has been shipped, the consumer may submit (e.g., using their computing device) shipping confirmation information, such as a tracking number, shipping receipt, etc., to the processing server 102. In an exemplary embodiment, the processing server 102 may make this shipping information available to the foreign consumer through the platform, where each consumer may be able to keep track of where their desired product is in transit. In cases where payment was held in escrow, the receipt of a shipping confirmation may prompt the processing server 102 to release a payment to the consumer that submitted the shipping confirmation. In some cases, a payment held in escrow may be returned to the payer in the event that no shipping confirmation is received for a predetermined period of time. For example, a consumer may have a predetermined period (e.g., 15 days), which may be set by the processing server 102 or in a purchase request, to have the desired product purchased and shipped or forfeit any payment thereto.

Each of the consumers may receive the foreign product once shipping has been completed. In some cases, release of escrow payments may await confirmation of the receipt of a shipped product. In instances where an incorrect or undesirable product is shipped, the processing server 102 may provide a dispute process, where the consumer may be compensated, the product returned, the foreign consumer penalized, etc. If each consumer has received the correct desired product, then the process between consumers may be completed, where each consumer has received a product from a foreign country without having to utilize specialized merchants and with minimal involvement of cross-border transactions, and where the use of electronic wallets and different currency types may be non-prohibitive for each consumer involved. In some embodiments, the processing server 102 may enable each consumer to provide feedback (e.g., a rating, comments, etc.) on the other consumer, such as for use in future matching and for consideration by a consumer when requested to approve a match for a new product request.

In some embodiments, a consumer may be matched with multiple consumers in a foreign country. For instance, as illustrated in FIG. 1, a requester 104 may be matched with two participants 110, illustrated in FIG. 1 as participants 110a and 110b. In such embodiments, multiple participants 110 may be matched to the requester 104 for convenience (e.g., each participant 110 wants the same product or from the same merchant), for financial reasons (e.g., the total price paid from all involved participants 110 matches the price paid by the requester 104), or other suitable reason. In these embodiments, the requester 104 may be provided the payment and requested product information for each of the participants 110. If only one product is desired by the requester 104, only one participant 110 may be selected to make the purchase in the second country 112. In some cases, participants 110 may be provide with the opportunity to volunteer to make the purchase. In some instances, a participant 110 may be randomly selected, may be selected based on the price of their desired product (e.g., the participant 110 with the highest priced product may be selected), or a combination thereof (e.g., random selection with weighting based on price). In some cases, feedback from prior purchases may be used in the selection (e.g., a participant 110 with a higher rating may be selected for the purchase). In some instances, the requester 104 may be able to pick the participant 110 that is to purchase their desired product.

In cases where multiple participants 110 are involved, the remainder of the process may be the same as discussed above for a single participant 110. In some such instances, the requester 104 may ship the desired product to each participant 110 individually. In other instances, the requester 104 may ship the desired products for all participants 110 to one of the participants (e.g., the participant 110a), which may ship the remaining desired products to the other participants 110, such as to minimize international shipping. In cases where multiple participants 110 are involved, payment transactions may be conducted by the processing server 102 through a local fiat currency account or using one of the participants 110 as a centralized account, such as to reduce cross-border transactions. For instance, rather than initiate payment from an account for each participant 110 to the account of the requester 104, payment may be made from the participant 110b to the participant 110a, and then from the participant 110a to the requester 104 for the full amount.

The methods and systems discussed herein enable consumers located in different countries to have purchased made on their behalf in another country through a platform that provides matching and facilitates any payment transactions necessary to accomplish the purchase and, in some cases, shipping required for delivery of the product. The result is that a consumer can have a product purchased for them in another country by simply purchasing a product in their own country in its stead, and having the product shipped to another consumer, without the consumer having to worry about cross-border transactions, foreign currency exchanges, international shipping issues with merchants, etc. Thus, the processing server 102 provides a technical system that can facilitate these exchanges between consumers in a manner that is impossible with current systems.

Processing Server

Figure 2:
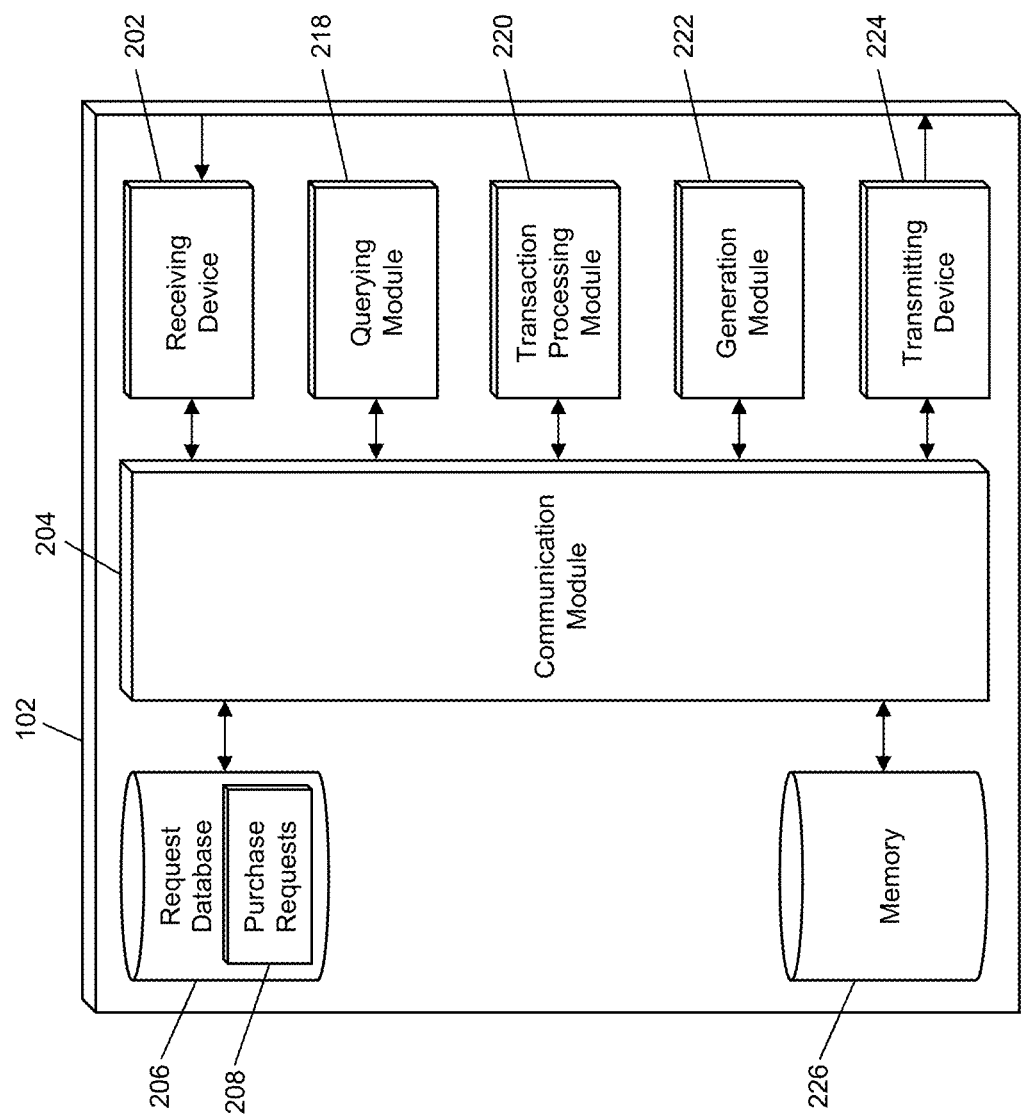
FIG. 2 is a block diagram illustrating a processing server in the system of FIG. 1 for facilitating foreign transactions through geographical matching in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from requester devices 106, participant devices 114, blockchain networks 11, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by requester devices 106 and participant devices 114 that may be superimposed or otherwise encoded with purchase requests. A purchase request may include at least a home country, a request country, a requested product, a product price, a destination address, and a source address. The receiving device 202 may also be configured to receive data signals electronically transmitted by requester devices 106 and participant devices 114 that are superimposed or otherwise encoded with shipping information, messages for another consumer, shipping confirmation data, updated transaction account information, and any other data discussed herein. The receiving device 202 may be further configured to receive data signals electronically transmitted by nodes in a blockchain network 116, which may be superimposed or otherwise encoded with updated blockchain data, blockchain transaction identifiers, etc. In some cases, the receiving device 202 may be configured to receive data signals from payment networks, financial institutions, or other entities regarding payment transactions initiated by or involving the processing server 102.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, transaction processing module 220, generation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a request database 206. The request database 206 may be configured to store a plurality of purchase requests 208 using a suitable data storage format and schema. The request database 206 may be a relational database that utilizes structured query language for the storage, identification, modifying, updating, accessing, etc. of structured data sets stored therein. Each purchase request 208 may be a structured data set that includes data from a purchase request submitted by a requester 104 or participant 110 in the system 110. In some cases, a purchase request 208 may also be updated to include information regarding matching, transaction history, shipping confirmations, messaging between consumers, and any other data pertaining to a purchase request as discussed herein.

The processing server 102 may include a querying module 218. The querying module 218 may be configured to execute queries on databases to identify information. The querying module 218 may receive one or more data values or query strings, and may execute a query string based thereon on an indicated database, such as the request database 206 of the processing server 102 to identify information stored therein. The querying module 218 may then output the identified information to an appropriate engine or module of the processing server 102 as necessary. The querying module 218 may, for example, execute a query on the request database 206 to insert a new purchase request 208, to identify purchase requests 208 for matching, to identify transaction account information for use in initiating new payment transactions, etc.

The processing server 102 may also include a transaction processing module 220. The transaction processing module 220 may be configured to perform functions related to the initiation and processing of electronic payment transactions and blockchain transactions as discussed herein. The transaction processing module 220 may be configured to, for instance, generate authorization requests, generate blockchain data values, calculate currency amounts, perform foreign currency exchange conversions, route transaction messages, validate digital signatures, etc.

The processing server 102 may also include a generation module 222. The generation module 222 may be configured to generate data for use by the processing server 102 in performing the functions discussed herein. The generation module 222 may receive instructions as input, may generate data based on the instructions, and may output the generated data to one or more modules of the processing server 102. For example, the generation module 222 may be configured to generate notification messages for transmission to requester devices 106 and participant devices 110, generate transaction messages and blockchain data values, generate digital signatures using private keys of the processing server 102, etc.

The processing server 102 may also include a transmitting device 224. The transmitting device 224 may be configured to transmit data over one or more networks via one or more network protocols. In some instances, the transmitting device 224 may be configured to transmit data to requester devices 106, participant devices 114, blockchain networks 116, payment networks, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to requester devices 106 and participant devices 114 that are superimposed or otherwise encoded with matched purchase requests, shipping information, transaction information, shipping confirmation data, prompts for feedback, received feedback, etc. The transmitting device 224 may also be configured to electronically transmit data signals to nodes in a blockchain network 116 that are superimposed or otherwise encoded with new blockchain data values or data for inclusion in a blockchain data value for use in initiating and processing a blockchain transaction. The transmitting device 224 may also be configured to electronically transmit data signals to a payment network, either directly via payment rails associated therewith or through an intermediate entity, such as an acquiring institution or gateway processor, for the initiation and processing of a payment transaction, which may be superimposed or otherwise encoded with transaction data and/or a transaction message, such as an authorization request.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for computing devices, public keys, key and signature generation algorithms, private keys, account information, foreign exchange rates, consumer feedback data, etc.

Process for Facilitating Foreign Transactions

Figure 3:
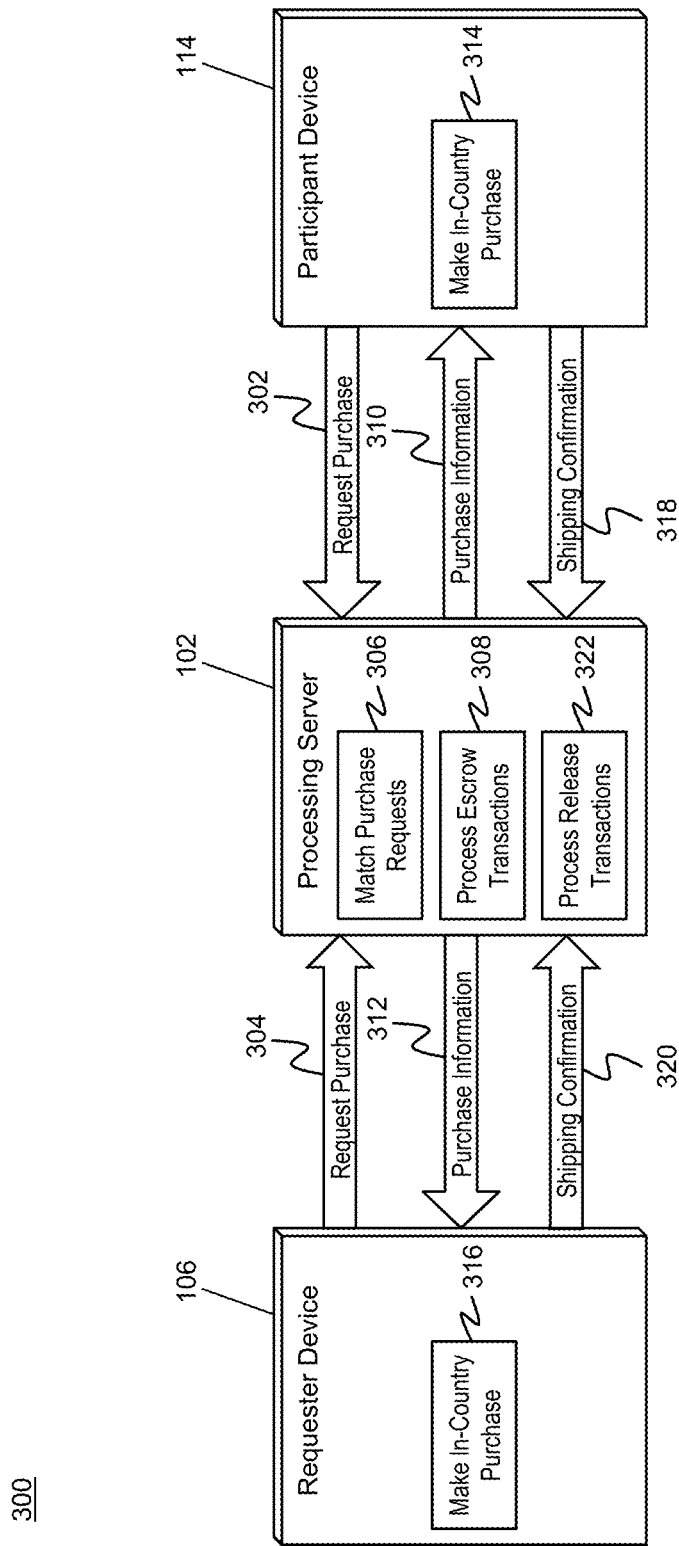
FIG. 3 is a flow diagram illustrating a process for facilitating transactions between consumers in different countries in the system of FIG. 1 in accordance with exemplary embodiments.

FIG. 3 illustrates an example process 300 in the system 100 of FIG. 1 for facilitating foreign transactions involving a requester 104 in a first country 108 and a participant 110 in a second country 112.

In step 302, a participant 110 may submit a purchase request to the processing server 102 using the participant device 114 and a suitable communication network and method. The purchase request may include the participant's home country (the second country 112), a request country (the first country 108), a requested product, a product price, a source address, and a destination address. In step 304, the requester 104 may submit their own purchase request to the processing server 102 using the requester device 106 and a suitable communication network and method. The purchase request may include the same information as the participant's purchase request, but where the countries are switched due to the location of the requester 104. Each of the purchase requests may be stored in the request database 206 as purchase requests 208. In step 306, the querying module 218 of the processing server 102 may execute one or more queries on the request database 206 to identify a match in the purchase requests 208 submitted by the requester 104 and the participant 110, such as based on the countries and the prices included in each purchase request 208.

In step 308, the transaction processing module 220 may initiate payment transactions to transfer the price indicated in each of the consumers' purchase request 208 in an escrow account, using the source address included in each of the respective purchase requests 208. In some cases, an escrow account that matches the currency of the transaction account indicated in the source address may be used. In other cases, a single escrow account may be used for both escrow transactions, where a foreign currency exchange may take place in one or both transactions, as necessary. In step 310, the transmitting device 224 of the processing server 102 may submit the purchase information for the requester's requested product to the participant device 114. The purchase information may include the requested product, shipping information, product price, and any other data that may be required by the participant 110 to make the purchase in the second country 112 on behalf of the requester 104. In step 312, the transmitting device 224 may submit the purchase information for the participant's requested product to the requester device 106 using any suitable communication network and method.

In step 314, the participant 110 may make a purchase in the second country 112 to purchase the requester's desired product, based on the purchase information provided to the participant device 114. In step 316, the requester 104 may make a purchase in the first country 108 to purchase the participant's desired product, based on the purchase information provided to the requester device 106. In step 318, the participant device 114 may electronically transmit shipping information regarding shipment of the requester's desired product that had been purchase to the requester 104, such as a tracking number and information regarding the service used for shipment, to the processing server 102. In step 320, the requester device 106 may electronically transmit shipping information to the processing server 102 regarding shipment of the participant's desired product that had been purchased to the participant 110, such as a tracking number and data regarding the service used for shipment.

In step 322, the transaction processing module 220 of the processing server 102 may initiate new payment transactions for release of the payments being held in escrow to the requester 104 and participant 110, as applicable, using the destination addresses included in the respective purchase requests 208. In some cases, the transaction processing module 220 may calculate a net position for the requester 104 and participant 110 and may only initiate one or more payment transactions suitable for achieving the net positions of each consumer based on the prices in the purchase requests 208. For instance, in the above example as discussed with respect to FIG. 1, a single payment transaction for release of $90 to the requester 104 may be performed in step 322.

Figure 4:
FIG. 4 is a flow chart illustrating an exemplary method for facilitating foreign transactions through inter-currency exchanges and geographical matching in accordance with exemplary embodiments.

Exemplary Method for Facilitating Foreign Transactions Through Geographical Matching FIG. 4 illustrates a method 400 for the facilitation of transactions in separate foreign countries by consumers located locally in the countries through geographical matching and inter-currency financial transactions.

In step 402, a plurality of purchase requests (e.g., purchase requests 208) may be stored in a memory (e.g., the request database 206, memory 226, etc.) of a processing server (e.g., the processing server 102), wherein each purchase request includes at least a home geographic location, a request geographic location, a product request, a product amount, a sending address, and a receiving address. In step 404, a new purchase request may be received by a receiver (e.g., the receiving device 202) of the processing server from a first computing system (e.g., the requester device 106), wherein the new purchase request includes a home country (e.g., the first country 108), a request country (e.g., the second country 112), a requested product, a product price, a source address, and a destination address.

In step 406, a query may be executed by a processing device (e.g., the querying module 218) of the processing server on the memory to identify one or more matched purchase requests where at least (i) the included home geographic location matches the request country, and (ii) the request geographic location matches the home country. In step 408, one or more payment transactions may be initiated by the processing device (e.g., the transaction processing module 220) of the processing server for payment from the sending address included in each of the one or more matched purchase requests for the product amount included in the respective matched purchase request.

In step 410, an additional payment transaction may be initiated by the processing device of the processing server for payment from the source address for the product price. In step 412, a first purchase message may be transmitted to the first computing system by a transmitter (e.g., the transmitting device 224) of the processing server, wherein the first purchase message includes at least the product request included in each of the one or more matched purchase requests. In step 414, a second purchase message may be transmitted by the transmitter of the processing server to a second computing system (e.g., a participant device 114) associated with the one of the one or more matched purchase requests, wherein the second purchase message includes at least the requested product.

In one embodiment, the one or more payment transactions may be for payment to the destination address. In some embodiments, the additional payment transaction may be for payment to the receiving address included in the one or more matched purchase requests. In some embodiments, the method 400 may further include receiving, by the receiver of the processing server, a shipping confirmation for shipment of the product request included in each of the one or more matched purchase requests from the first computing system. In a further embodiment, the one or more payment transactions may be for payment to an intermediate address, and the method 400 may also include initiating, by the processing device of the processing server, a subsequent payment transaction for payment from the intermediate address to the destination address for an amount equal to the product amount included in each of the one or more matched purchase requests after receipt of the shipping confirmation.

In one embodiment, the method 400 may further include receiving, by the receiver of the processing server, a shipping confirmation for shipment of the requested product from the second computing system. In a further embodiment, the additional payment transaction may be for payment to an intermediate address, and the method 400 may also include initiating, by the processing device of the processing server, a subsequent payment transaction for payment from the intermediate address to the destination address for the product price after receipt of the shipping confirmation. In some embodiments, the one or more payment transactions and the additional payment transaction may be blockchain transactions.

Computer System Architecture

Figure 5:
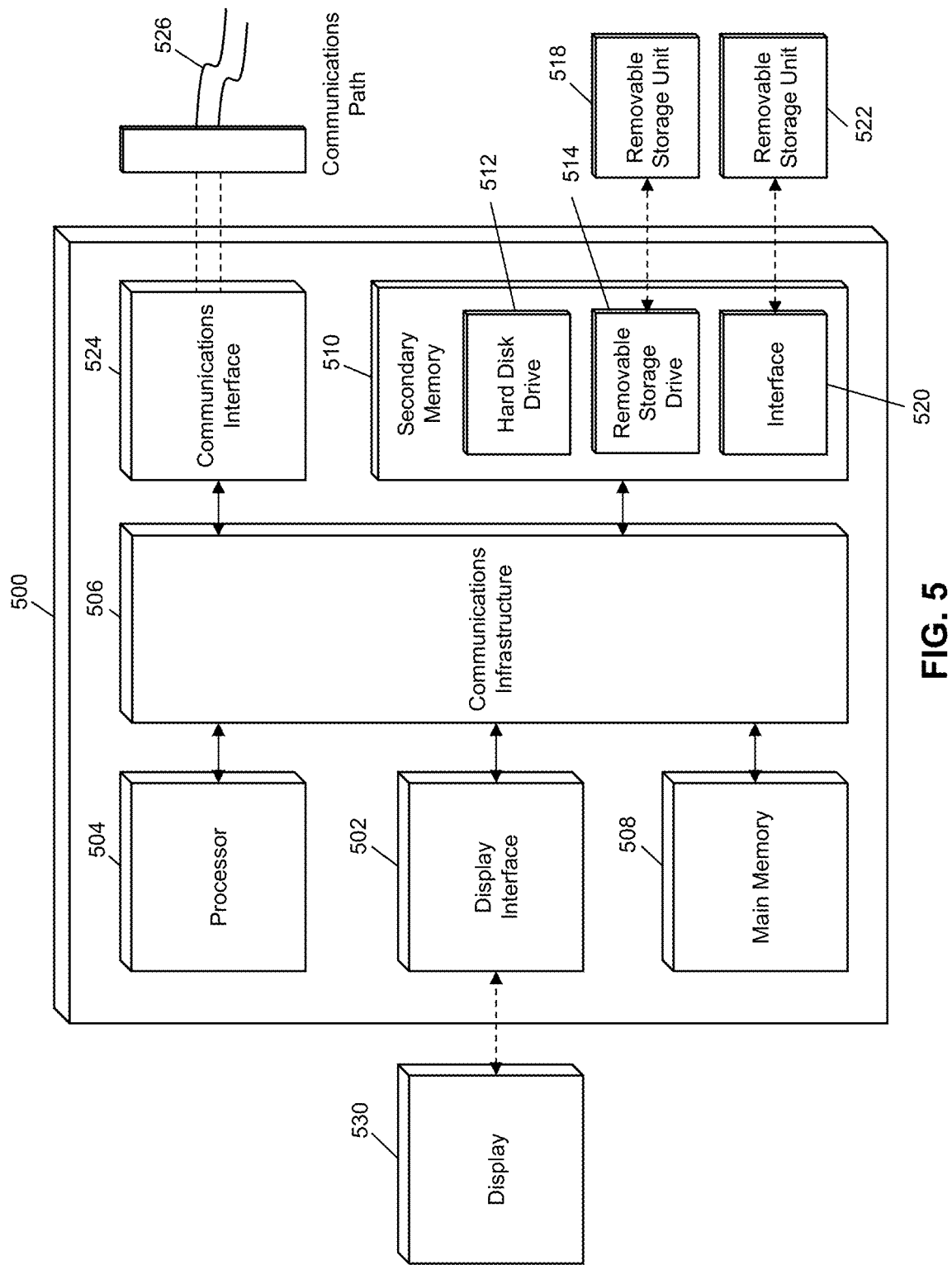
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for facilitating foreign transactions through inter-currency exchanges and geographical matching. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for facilitating foreign transactions through inter-currency exchanges and geographical matching, comprising:

storing, in a memory of a processing server, a plurality of purchase requests, wherein each purchase request includes at least a home geographic location, a request geographic location, a product request, a product amount, a sending address, and a receiving address;

receiving, by a receiver of the processing server, a new purchase request from a first computing system of a first user, wherein the new purchase request includes a home country of the first user, a requested product, a request country from which the first user would like to purchase the requested product, a product price, a source address, and a destination address;

executing, by a processing device of the processing server, a query on the memory to identify one or more matched purchase requests where at least (i) the home geographic location included in the one or more matched purchase requests matches the request country included in the received new purchase request, and (ii) the request geographic location included in the one or more matched purchase requests matches the home country included in the received new purchase request;

initiating, by the processing device of the processing server, at least a first payment transaction for payment from the sending address included in each of the one or more matched purchase requests for the product amount included in the respective matched purchase request;

initiating, by the processing device of the processing server, a second payment transaction for payment from the source address for the product price;

after the at least first transaction and the second transaction occur, transmitting, by a transmitter of the processing server, a first purchase message to the first computing system of the first user informing the first user of a first product needing purchased, wherein the first purchase message includes at least the product request included in each of the one or more matched purchase requests; and transmitting, by the transmitter of the processing server, a second purchase message to a second computing system of a second user associated with the one of the one or more matched purchase requests, informing the second user of a second product needing purchased, wherein the second purchase message includes at least the requested product.

2. The method of claim 1, wherein the at least one payment transaction is for payment to the destination address.

3. The method of claim 1, wherein the second payment transaction is for payment to the receiving address included in the one or more matched purchase requests.

4. The method of claim 1, further comprising:
receiving, by the receiver of the processing server, a shipping confirmation for shipment of the product request included in each of the one or more matched purchase requests from the first computing system.

5. The method of claim 4, wherein
the at least one payment transaction is for payment to an intermediate address, and
the method further comprises:
initiating, by the processing device of the processing server, a subsequent payment transaction for payment from the intermediate address to the destination address for an amount equal to the product amount included in each of the one or more matched purchase requests after receipt of the shipping confirmation.

6. The method of claim 1, further comprising:
receiving, by the receiver of the processing server, a shipping confirmation for shipment of the requested product from the second computing system.

7. The method of claim 6, wherein
the second payment transaction is for payment to an intermediate address, and the method further comprises:
initiating, by the processing device of the processing server, a subsequent payment transaction for payment from the intermediate address to the destination address for the product price after receipt of the shipping confirmation.

8. The method of claim 1, wherein the at least one payment transaction and the second payment transaction are blockchain transactions.

9. A system for facilitating foreign transactions through inter-currency exchanges and geographical matching, comprising:
a memory of a processing server configured to store a plurality of purchase requests, wherein each purchase request includes at least a home geographic location, a request geographic location, a product request, a product amount, a sending address, and a receiving address;

a receiver of the processing server configured to receive a new purchase request from a first computing system of a first user, wherein the new purchase request includes a home country of the first user, a requested product, a request country from which the first user would like to purchase the requested product, a product price, a source address, and a destination address;

a processing device of the processing server configured to
execute a query on the memory to identify one or more matched purchase requests where at least (i) the home geographic location included in the one or more matched purchase requests matches the request country, and (ii) the request geographic location included in the one or more matched purchase requests matches the home country included in the received new purchase request, initiate at least one payment transaction for payment from the sending address included in each of the one or more matched purchase requests for the product amount included in the respective matched purchase request, and initiate a second payment transaction for payment from the source address for the product price; and a transmitter of the processing server configured to, after the at least first transaction and the second transaction occur, transmit a first purchase message to the first computing system of the first user informing the first user of a first product needing purchased, wherein the first purchase message includes at least the product request included in each of the one or more matched purchase requests, and transmit a second purchase message to a second computing system of a second user associated with the one of the one or more matched purchase requests, informing the second user of a second product needing purchased, wherein the second purchase message includes at least the requested product.

10. The system of claim 9, wherein the at least one payment transaction is for payment to the destination address.

11. The system of claim 9, wherein the second payment transaction is for payment to the receiving address included in the one or more matched purchase requests.

12. The system of claim 9, wherein the receiver of the processing server is further configured to receive a shipping confirmation for shipment of the product request included in each of the one or more matched purchase requests from the first computing system.

13. The system of claim 12, wherein the at least one payment transaction is for payment to an intermediate address, and the processing device of the processing server is further configured to initiate a subsequent payment transaction for payment from the intermediate address to the destination address for an amount equal to the product amount included in each of the one or more matched purchase requests after receipt of the shipping confirmation.

14. The system of claim 9, wherein the receiver of the processing server is further configured to receive a shipping confirmation for shipment of the requested product from the second computing system.

15. The system of claim 14, wherein the second payment transaction is for payment to an intermediate address, and the processing device of the processing server is further configured to initiate a subsequent payment transaction for payment from the intermediate address to the destination address for the product price after receipt of the shipping confirmation.

16. The system of claim 9, wherein the at least one payment transaction and the additional payment transaction are blockchain transactions.

* * * * *